(12) United States Patent
Reichow et al.

(10) Patent No.: US 6,631,987 B2
(45) Date of Patent: Oct. 14, 2003

(54) ACTIVITY-SPECIFIC OPTICAL FILTERS AND EYEWEAR USING SUCH FILTERS

(75) Inventors: Alan W. Reichow, Beaverton, OR (US); Karl Citek, Hillsboro, OR (US); Robert L. Yolton, Forest Grove, OR (US)

(73) Assignee: Nike, Inc., Beaverton, OR (US)

( * ) Notice: Subject to any disclaimer, the term of this patent is extended or adjusted under 35 U.S.C. 154(b) by 125 days.

(21) Appl. No.: 09/768,940

(22) Filed: Jan. 23, 2001

(65) Prior Publication Data

US 2002/0135734 A1 Sep. 26, 2002

(51) Int. Cl.[7] ................................................ G02C 7/10
(52) U.S. Cl. ......................... 351/163; 351/177; 351/44
(58) Field of Search ............................. 351/163, 164, 351/165, 177, 162, 44

(56) References Cited

U.S. PATENT DOCUMENTS

| | | | |
|---|---|---|---|
| 3,887,742 A | * | 6/1975 | Reinnagel .................. 428/211 |
| 4,247,177 A | | 1/1981 | Marks et al. |
| 4,952,046 A | | 8/1990 | Stephens et al. |
| 5,218,386 A | | 6/1993 | Levien |
| 5,363,152 A | | 11/1994 | Reed, III |
| 5,592,245 A | | 1/1997 | Moore et al. |
| 5,962,140 A | | 10/1999 | Rajagopalan |
| 6,132,044 A | | 10/2000 | Sternbergh |
| 2002/0005936 A1 | | 1/2002 | Gibb et al. |

FOREIGN PATENT DOCUMENTS

| WO | WO 98/26326 | 6/1998 |
|---|---|---|
| WO | WO 99/67677 | 12/1999 |
| WO | WO 01/11398 A1 | 2/2001 |

* cited by examiner

*Primary Examiner*—Scott J. Sugarman
(74) *Attorney, Agent, or Firm*—Klarquist Sparkman, LLP

(57) ABSTRACT

Eyewear include lenses having spectral transmittances selected for viewing an object with respect to a background The spectral transmittances are selected to provide a natural feel to scenes viewed with the eyewear. In one example, a lens for viewing a white golf ball includes an object-contrast spectral window that transmits radiation at wavelengths of about 440 nm, a background window that transmits wavelengths at about 550 nm, and a spectral-width window that transmits wavelengths between about 620 nm and 700 nm. Similar eyewear can be configured for other activities. Methods for selecting filters and lenses for such eyewear are also provided.

32 Claims, 2 Drawing Sheets

ACTIVITY-SPECIFIC OPTICAL FILTERS AND EYEWEAR USING SUCH FILTERS

TECHNICAL FIELD

The invention pertains to optical filters for viewing a selected object with respect to a background and eyewear that include such filters.

BACKGROUND

Individual effectiveness in performing physical tasks frequently depends upon an individual's visual skills, such as acuity, contrast-sensitivity, and depth perception. For example, skilled crafts such as welding, cabinetmaking, and jewelry-making require accurate perception of objects. Recreational activities such as team and individual sports as well as outdoor recreational pursuits such as mountain climbing and hunting rely on visual performance. For most individuals, visual acuity is readily correctable with corrective eyewear, contact lenses, or surgical techniques. Unfortunately, such correction generally does not improve visual skills other than acuity. For many activities, enhancement of skills such as color-contrast sensitivity and depth perception beyond the normal range of vision is desirable.

For some activities, protective eyewear or other vision protection is necessary. Such vision protection typically reduces or eliminates the possibility of activity-specific injuries or activity-specific exposure to reagents, intense light fluxes, or light fluxes in particularly harmful wavelength ranges. For example, dark tinted lenses can be used to reduce exposure to intense light fluxes characteristic of welding, or goggles can be used to protect the eyes from injuries in sports such as basketball that involve risk of physical contact. While such protective eyewear can prevent eye injuries, the eyewear often interferes with or degrades various visual skills.

Stephens et al., U.S. Pat. No. 4,952,046, disclose protective eyewear based on lenses that exhibit a sharp-cut spectral transmittance that substantially eliminates all incident radiation at wavelengths shorter than 515 nm and transmits substantially all incident radiation at wavelengths greater than 636 nm. The radiation at wavelengths shorter than 515 nm that is removed by these lenses has been implicated in senile macular degeneration and snow blindness, so that these lenses provide protection against these conditions.

Specially adapted optical filters have been suggested that transmit more light at wavelengths overlapping a wavelength range in which a colored object reflects or emits light. See, for example, Moore et al., PCT App. No. PCT/US96/19761. In one example, Moore et al. suggest applying a blue dye to a transparent lens for enhanced viewing of an optic yellow tennis ball.

The eyewear of Stephens et al. and Moore et al. are intended to improve eye safety and enhance object visibility. Nonetheless, such eyewear exhibit numerous limitations and improved filters and eyewear are needed.

SUMMARY

While prior art eyewear can provide eye protection and enhance the visibility of a colored object, such eyewear is typically unpleasant to wear because of the unnatural appearance of scenes viewed through the eyewear. For example, background surfaces can appear too dark because radiation at wavelengths reflected from background surfaces is attenuated by the eyewear. In an extreme example, a background can appear black. In addition, color rendition with such eyewear is peculiar, and users of such eyewear find the appearance of common scenes unnatural. Users of such eyewear may also experience difficulty in accurately focusing on objects, thereby affecting depth perception and timing.

Optical filters and lenses for viewing a selected object are provided that have a spectral transmittance that includes an object-contrast spectral window and a background spectral window. The object-contrast window corresponds to a spectral distribution of light reflected or emitted by the selected object. The background window includes wavelengths corresponding to radiation received from a reflective or luminous background against which the object is viewed. In alternative embodiments, the filters have spectral transmittances that include a spectral-width window. In a particular example, the background window includes a wavelength range from about 540 nm to about 560 nm or a wavelength range of from about 530 nm to about 570 nm.

In additional embodiments, the optical filters have a background window corresponding to a reflecting spectral region of vegetation. In other example filters, the object-contrast window corresponds to a fluorescence spectrum of light emitted by the object. According to additional examples, such object-contrast optical filters can include a spectral-width window configured to provide more natural appearing scenes as viewed with the filters and to provide a broader spectral bandwidth to the user's eye. In some examples, the spectral-width window includes wavelengths greater than about 610 nm.

Eyewear for enhanced viewing of an object with respect to a background include a frame and at least one lens configured to be placed with respect to a wearer's eyes so that the wearer looks through the lens when the eyewear is worn. The lens defines a spectral transmittance having an object-contrast window and a background window. In representative examples, the background window corresponds to a wavelength range in which vegetation is reflective. In other examples, the background window includes wavelengths between about 540 nm to about 560 nm, or other wavelength ranges.

According to additional embodiments, eyewear include a lens having an object-contrast window that preferentially transmits, reflects, or otherwise directs light corresponding to a wavelength-conversion spectral power distribution to the wearer's eye. According to other examples, the eyewear include a lens that defines a spectral-width window.

Eyewear are provided that include an optical filter that preferentially transmits light within an object-contrast window and a background window. In some examples, the object-contrast window corresponds to an object-specific reflectance window or an object-specific wavelength-conversion window.

Natural-contrast, enhanced-visibility eyewear include a lens having a spectral transmittance that has a background window and an enhanced-visibility window. The lens is retained by a frame that situates the lens so that a wearer looks through the lens with the eyewear as worn. In representative examples, the lens is a unitary lens and is situated by the frame so that a wearer views through the lens with both eyes with the eyewear as worn.

These and other features and aspects of the invention are described below with reference to the accompanying drawings.

DETAILED DESCRIPTION

Figure 1:
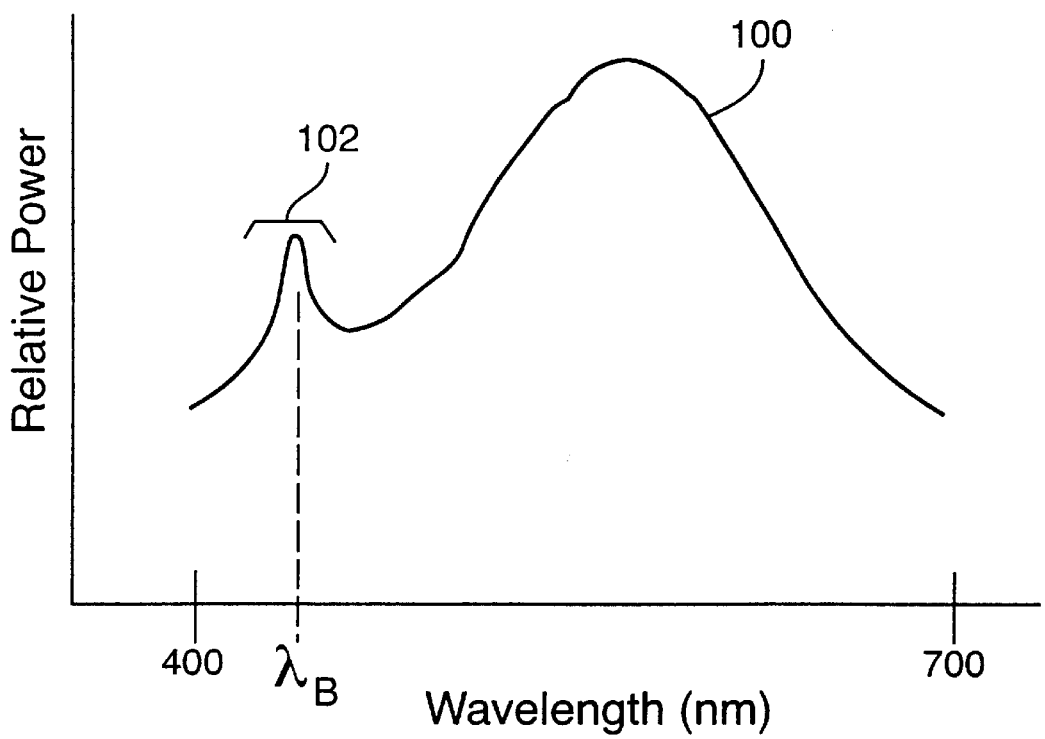
FIG. 1 is a graph of optical power reflected and emitted by a golf ball as a function of wavelength.

Optical filters that enhance object visibility while preserving the natural appearance of viewed scenes are described. Such optical filters (and eyewear that include such filters) can be configured for a wide range of recreational, sporting, professional, and other activities. As a representative example, filters and eyewear configured for golf are described.

Golf balls and corresponding eyewear are provided in which a golf ball cover is configured to produce wavelength-converted light and the eyewear include lenses having an object-contrast spectral window corresponding to a spectral reflectance of the cover or a spectrum of wavelength-converted light emitted by the cover.

Golf balls are provided that have a cover that is configured to wavelength-convert light that is incident at a first wavelength or in a first wavelength range. The wavelength-converted light is emitted at longer wavelengths than the wavelength of the absorbed incident light. The wavelength-converted light has at least a portion corresponding to an object-contrast window of corresponding eyewear. In representative examples, the golf balls have covers that include a fluorescent material that produces fluorescence in a spectral region corresponding to a spectral transmittance of a viewing filter. In additional embodiments, a portion of the object-contrast window corresponds to a spectral region in which light is preferentially reflected by the cover.

Methods of enhancing object visibility with respect to a background include providing a contrast agent to the object to be viewed. A light spectrum produced by the contrast agent defines an object-contrast spectral window. An optical filter is provided that includes a spectral window corresponding to the object-contrast window, and a background window corresponding to a reflectance spectrum of the background. In representative embodiments, the contrast agent is a wavelength-conversion agent, a colorant, or both. In alternative examples, the optical filter includes a spectral-width window that broadens the transmission spectrum of the filter. In some particular examples, the object-visibility window, the background window, and the spectral-width window include wavelengths from about 440 nm to about 470 nm, about 510 nm to about 580 nm, and about 600 nm to about 650 nm, respectively. In additional examples, the windows include wavelengths between about 400 nm and about 700 nm.

These and other features and aspects of the invention are described below with reference to golf and other sporting and non-sporting applications. For convenience, several representative examples pertaining to golf are described, but it will be apparent that these examples can be modified in arrangement and detail for other leisure, recreational, sporting, industrial, professional, or other activities.

Viewing a golf ball's trajectory and determining its location are important to golfers of all skill levels. Trajectories of a golf ball hit by an inexperienced golfer are unpredictable and frequently place the ball in locations in which the ball is hard to find. Such failures to promptly find a golf ball increase the time required to play a round, and reduce the number of rounds that can be played on a course in a day. Because time spent looking for errant golf balls contributes to slow play, many courses and many tournaments have rules concerning how long a golfer is permitted to search for a lost golf ball before putting a replacement ball into play. For more experienced or expert golfers, loss of a golf ball results in imposition of a penalty that adds strokes to the golfer's score. Such penalty strokes are annoying, especially when the loss of a ball results from an inability to find the ball due to poor viewing conditions and a limited time in which to search.

With reference to FIG. 1, a spectral power distribution 100 of radiation from a golf ball in outdoor illumination such as direct sunlight or other illumination conditions includes a blue-enhanced portion 102 located in a wavelength region near a wavelength XB. The blue-enhanced portion 102 can be produced by conversion of radiation within a range of wavelengths shorter than that of the portion 102 to radiation at wavelengths within the blue-enhanced portion 102. Such wavelength-conversion can result from fluorescence, phosphorescence, or other processes. As used herein, any process in which radiation at a shorter wavelength is converted into radiation at a longer wavelength is referred to as a wavelength-conversion process. As noted above, a typical example of such a process is fluorescence in which radiation at a first wavelength is absorbed to produce radiation at a longer wavelength. Because the human eye is less sensitive to radiation at wavelengths shorter than the wavelengths of the blue-enhanced portion 102 than to radiation within the blue-enhanced portion 102, conversion of radiation from the shorter wavelengths into longer wavelength radiation tends to make the golf ball appear whiter and brighter. The spectral power distribution of FIG. 1 corresponds to a golf ball that appears white and spectral power distributions for non-white golf balls can have additional spectral features characteristic of the golf ball's color.

Spectral power at wavelengths shorter than the conventional cutoff of human visual response at wavelengths of about 400 nm is not shown in FIG. 1. Radiation at these shorter wavelengths produces limited human visual response. Conversion of these shorter wavelengths into longer wavelengths by fluorescence or other wavelength-conversion process can produce radiation that makes an appreciable contribution to visual response. This conversion process can be enhanced by the selection of a golf ball cover that produces such wavelength-converted light or by incorporating suitable fluorescent, phosphorescent, or other wavelength-conversion agents into the golf ball cover. A typical wavelength-conversion agent produces a blue-enhanced region at a wavelength $\lambda_B$ that is typically in the range between about 440–480 nm, but wavelength-conversion agents for other wavelength ranges can be used. If the golf ball (or other object of interest) need not appear white, colored wavelength-conversion agents can be used, such as colored fluorescent agents.

The spectral power distribution 100 illustrated in FIG. 1 is representative of the optical radiation from a golf ball under outdoor illumination conditions. More accurate spectral power distribution values depend on the exact illumination conditions. Typical illumination conditions include illumination from direct sunlight and overcast skies as well as illumination produced in deep shadows. Under these different illumination conditions, different spectral power distributions are produced. For example, an overcast sky typically produces a spectral power distribution having less total energy as well as relatively less energy at shorter (bluer) wavelengths. Nevertheless, the spectral power distributions associated with these varying illumination conditions have corresponding blue-enhanced portions produced by wavelength-conversion processes.

Visual perception of a golf ball that produces the spectral power distribution of FIG. 1 is improved by preferentially transmitting the enhanced blue portion 102 (the wavelength-converted portion) to the viewer's eye. The blue-enhanced portion 102 has excess blue spectral power relative to the ambient illumination and providing a blue transmitting filter therefore permits improve tracking and location of the golf ball. While preferentially transmitting the blue-enhanced portion of the spectral power distribution of FIG. 1 permits increased golf ball visibility under many conditions, the extent of this increased visibility depends on the background in which the golf ball is viewed. However, for common backgrounds encountered in golf such as fairway or putting surface grasses, preferential transmission of the blue enhanced component increases golf ball visibility. Therefore, wearing eyewear that includes lenses that preferentially transmit the blue enhanced portion permits the golfer to more readily follow the trajectory of a golf ball and to locate the golf ball after it has come to rest.

While such eyewear can increase golf ball visibility and permit easier tracking and location of a golf ball, altering the spectral power distribution of light transmitted to the golfer's eyes can produce scenes that appear unnatural or even disturbing to the golfer. During play of a typical round, the golfer encounters many different backgrounds including blue skies, overcast skies, rock, sand, dirt, and vegetation, including putting surfaces, fairways, sand traps, and rough. Eyewear that preferentially transmits the enhanced blue portion can produce an unnatural or disturbing appearance to all or some of these surroundings, and impair the golfer's concentration or perception. Such unnatural appearances can offset any performance advantage associated with increased golf ball visibility.

Figure 2:
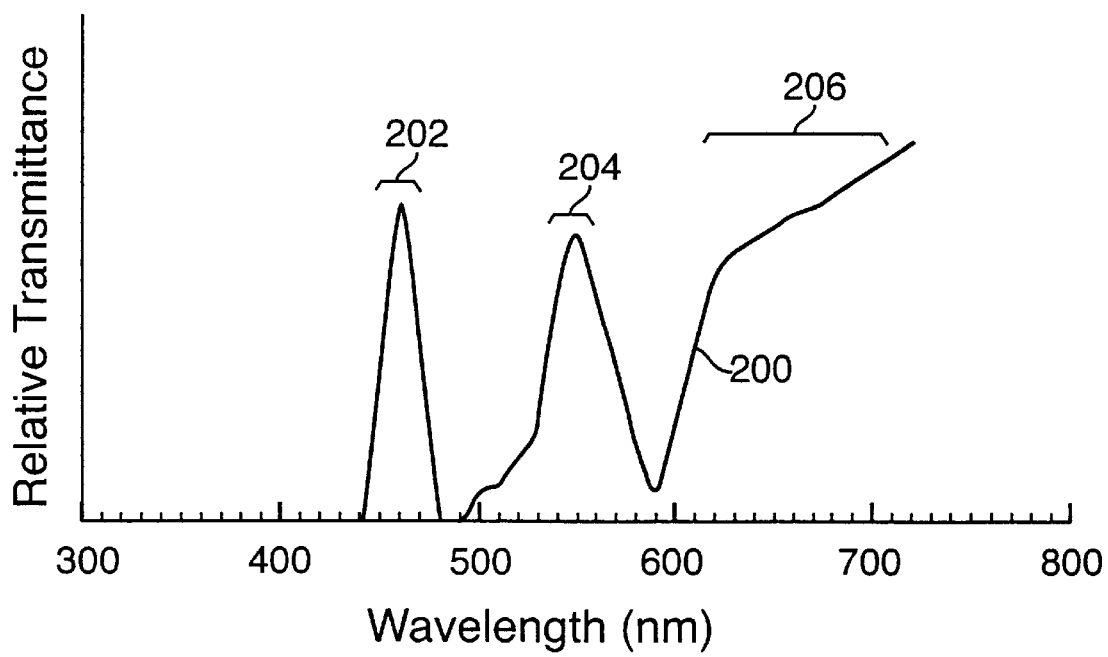
FIG. 2 is a graph of transmittance as a function of wavelength for an optical filter configured for viewing of a golf ball.

More natural appearing viewing can be obtained with an optical filter having a spectral transmittance 200 that is shown in FIG. 2. Such an optical filter provides improved golf ball visibility while maintaining a natural appearance of scenes viewed through such a filter. As used herein, a spectral region in which an optical filter transmits is referred to as a spectral window. A width of a spectral window can be defined as a full width at about 50%, 25%, 10%, or 5% of the maximum transmittance within the spectral window. The spectral transmittance 200 includes a blue-transmitting spectral window 202 as well as a green-transmitting spectral window 204 and a red-transmitting spectral window 206. As shown in FIG. 2, the blue window 202 has a maximum spectral transmittance at a wavelength of about 460 nm, corresponding to a blue enhancement produced by fluorescence in the golf ball cover material or a wavelength-conversion agent added to the cover material. The spectral location of the blue window 202 can be selected to correspond to a particular fluorescent agent so that eyewear can be spectrally matched to a particular fluorescent agent. Thus, eyewear and golf balls can be spectrally matched to provide enhanced golf ball visibility. The spectral transmittance at wavelengths below about 440 nm is low so that potentially harmful short wavelength radiation is blocked. Some of this short wavelength radiation is converted by the fluorescent agent to radiation at wavelengths corresponding to the blue window 202. The average transmittance of such a filter for golf is about 20%–30%. Filters for outdoor use typically have average transmittances between about 8%–80%, 10%–60%, or 10%–40%. Filters for indoor use (or use at illumination levels lower than normal daylight illumination) have average transmittances between about 20%–90%, 25%–80%, or 40%–60%. One embodiment, having transmittances listed in the following Table 1, has an average transmittance of about 25%.

TABLE 1

Spectral transmittance of a filter configured for viewing a golf ball in daylight illumination.

| Wavelength (nm) | Transmittance (%) | Wavelength (nm) | Transmittance (%) |
|---|---|---|---|
| 380 | 0 | 580 | 13 |
| 390 | 0 | 590 | 5 |
| 400 | 0 | 600 | 15 |
| 410 | 0 | 610 | 27 |
| 420 | 0 | 620 | 38 |
| 430 | 0 | 630 | 42 |
| 440 | 0 | 640 | 44 |
| 450 | 25 | 650 | 46 |
| 460 | 50 | 660 | 48 |
| 470 | 25 | 670 | 49 |
| 480 | 0 | 680 | 51 |
| 490 | 0 | 690 | 53 |
| 500 | 5 | 700 | 55 |
| 510 | 6 | 710 | 57 |
| 520 | 10 | 720 | 59 |
| 530 | 15 | 730 | 40 |
| 540 | 35 | 740 | 15 |
| 550 | 45 | 750 | 0 |
| 560 | 35 | 760 | 0 |
| 570 | 25 | | |

Figure 3:
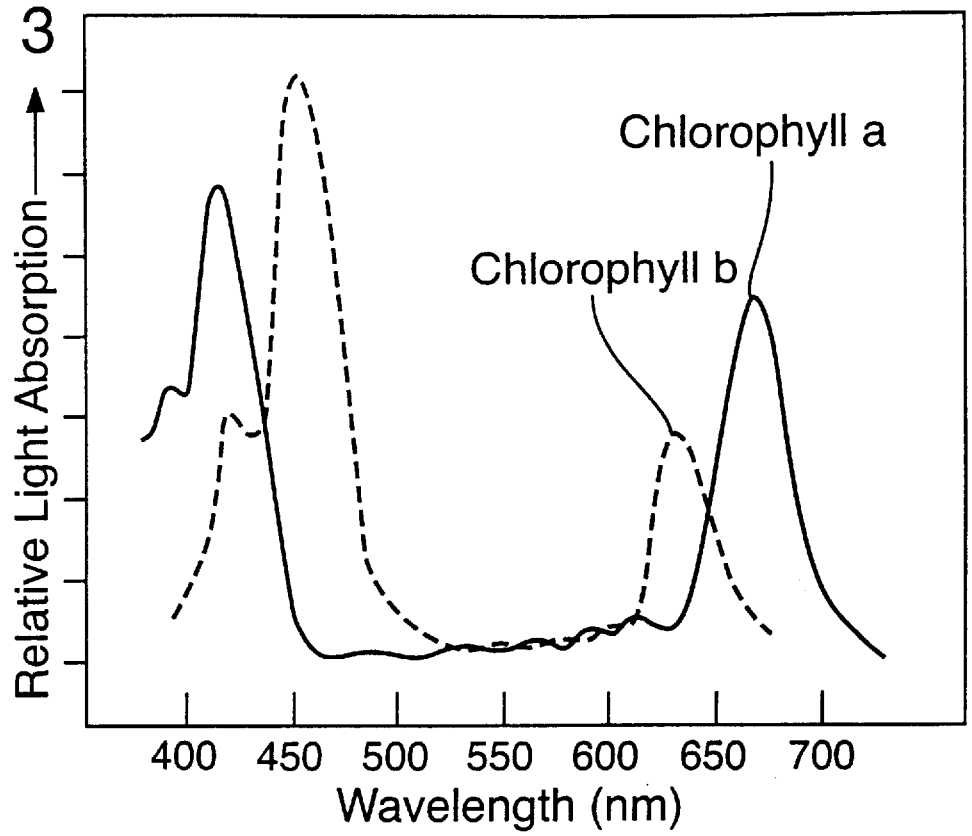
FIG. 3 is a graph of reflectance spectra of chlorophyll a and chlorophyll b.

As shown in FIG. 2, the green window 204 has a maximum spectral transmittance wavelength of about 550 nm. Because vegetation typically appears green, the green window brightens portions of a scene that include vegetation. FIG. 3 illustrates the spectral absorptions of chlorophyll a and chlorophyll b that contribute to vegetation appearance. As shown in FIG. 3, both chlorophyll a and chlorophyll b are relatively reflective at wavelengths between about 500 nm and 600 nm. Without the green window 204, light at wavelengths between 500 nm and 600 nm is blocked or attenuated, and vegetation would appear relatively dark. As a result, the golfer's surroundings would appear unnatural and the golfer's perception of vegetation would be impaired. The impairment is especially serious with respect to putting because the golfer generally tries to precisely determine various parameters of the putting surface, including height and thickness of the grass covering the putting surface, orientation of the blades of grass of the putting surface, and the surface topography. Because a golfer takes about one-half of her strokes at or near putting surfaces, any visual impairments at putting surfaces are serious performance disadvantages and are generally unacceptable.

Misperception of vegetation is also a significant disadvantage when playing out of a fairway or rough. The green window 204, in combination with the blue window 202, permits enhanced golf ball visibility while permitting accurate assessment of background surfaces such as putting surfaces or other vegetation.

In the example of FIG. 2, the red window 206 extends over a wavelength range from about 610 nm to about 720 nm, but the transmission of radiation at wavelengths beyond about 700 nm provides only a small contribution to a viewed scene because of the low sensitivity of the human eye at these wavelengths. The red window 206 enhances the natural appearance of scenery viewed with an optical filter having a spectral transmittance corresponding to FIG. 2, transmitting some red light reflected by vegetation, and provides additional advantages by improving the golfer's ability to focus more accurately. Because the ability of the human vision system to focus is proportional to the spectral bandwidth of the radiation received by the eyes, the more polychromatic light produced by transmitting red, green, and blue components of light permits improved focus. In addition, convergence (pointing of the eyes to a common point) and focusing (accommodation) are interdependent, so that improved focusing permits improved convergence and improved depth perception. Therefore, providing spectrally transmitting windows in the green and red portions of the spectrum permits improved depth perception as well as improved focus. Thus, a filter having such spectral windows provides improved perception of vegetation (especially putting surfaces) as well as providing more natural looking scenery while retaining the enhanced golf ball visibility associated with the blue window. In addition, by transmitting additional spectral components, dilation of the golfer's pupil is reduced, further improving the golfer's ability to see objects accurately.

Optical filters can be similarly configured for a variety of activities in which tracking and observation of an object against a background is facilitated by wavelength-conversion. Such filters can include a wavelength-conversion window, a background window, and a spectral-width window. These spectral windows are selected to transmit wavelength-converted light, light from activity-specific backgrounds, and light at additional wavelengths to further extend the total spectral width of transmitted light to improve focus, accommodation, or provide more natural viewing. For application to a white golf ball as described above, an optical filter is provided with a blue window corresponding to wavelength-conversion spectral components, a green window to facilitate viewing of a background, and a red window to improve accommodation and the natural appearance of scenes. Such an optical filter can be substantially color neutral. For other activities, particular spectral windows can be chosen based on expected or measured background colors and wavelengths produced by a wavelength-conversion process. For example, tennis is often played on a green playing surface with an optic yellow ball. Such a ball typically has a wavelength conversion region that produces wavelength-converted light at wavelengths between about 460 nm and 540 nm. An example filter for such an application has a wavelength-conversion window at between 460–540 nm, and a background window centered at about 550 nm. The wavelength-conversion window and the background window can have some overlap. To provide more natural contrast and better focus, additional transmission windows can be provided in wavelength ranges of about 440–460 nm, 620–700 nm, or in other ranges.

In alternative embodiments, an optical filter having an object-specific spectral window in addition to or instead of a wavelength-conversion window is provided. For example, for viewing of a golf ball that appears red, the optical filter can include a red spectral window that enhances red transmission to improve golf ball visibility. For natural, accurate viewing of backgrounds (such as putting surfaces), a green spectral window is also provided. If the golf ball also emits wavelength converted light, an additional wavelength-conversion window can be provided, if needed. The filter can also include a spectral-width window.

Figure 4:
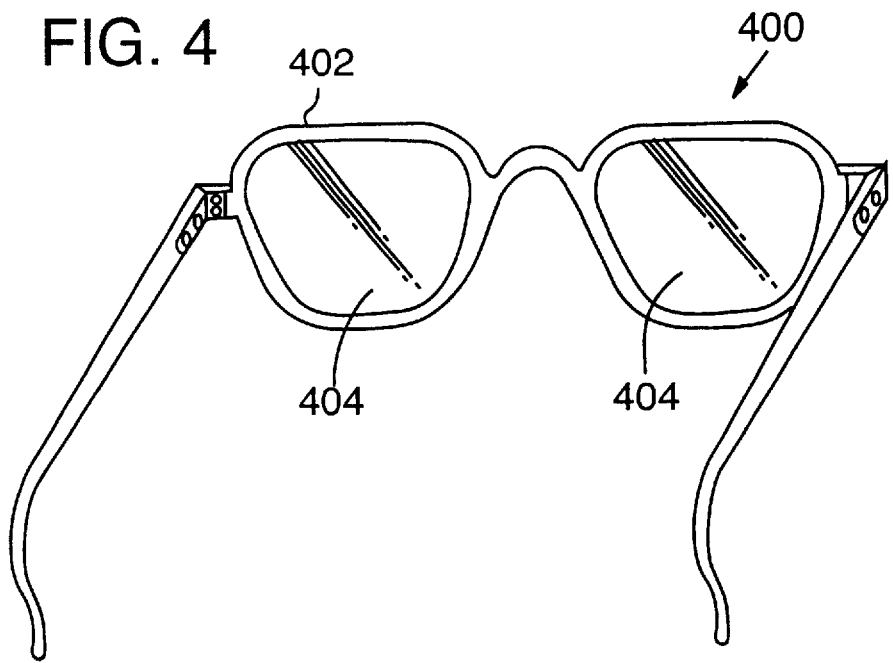
FIG. 4 is a perspective view of eyewear that includes lenses having spectral transmittances corresponding to the graph of FIG. 3.

With reference to FIG. 4, eyewear 400 include a frame 402 and lenses 404. The lenses 404 have a spectral transmittance that includes a wavelength-conversion window, a background-window, and a spectral-width window. For some applications, the spectral-width window may be omitted. For other applications, an object-specific spectral window is provided that can include the wavelength-conversion window. The lenses 404 can be prescription lenses or non-prescription lenses and can be made of any of a variety of optical materials including glasses or plastics such as acrylics or polycarbonates. The lenses can have various shapes, including plano—plano and meniscus shapes. In alternative eyewear, a frame is configured to retain a unitary lens that is placed in front of both eyes when the eyewear is worn. Goggles can also be provided that include a unitary lens that is placed in front of both eyes when the goggles are worn.

The spectral transmittance of the lenses 404 can be obtained in several ways. A coating can be provided to one or more surfaces of the lenses. Such coatings typically include one or more layers of coating materials configured to achieve a selected spectral transmittance. The layers can be absorptive so that radiation from spectral regions that are to be attenuated is absorbed in the coating, or the coating can be reflective so that radiation at such wavelengths is reflected. In yet another example, one or more dyes or other chromophores are incorporated within the lens material by a dyeing or other process. Two or more of the above methods can be combined to produce the desired spectral characteristics.

While embodiments are described above with reference to a particular activity (i.e., golf), additional examples can be provided for other activities. For example, a natural contrast, enhanced-visibility filter can be provided for sports such as baseball, tennis, badminton, basketball, racquetball, handball, archery, target shooting, trap shooting, cricket, lacrosse, football, ice hockey, field hockey, hunting, soccer, squash, or volleyball. For such sports, such a filter includes an object-contrast window selected to transmit wavelength-converted light produced by a fluorescent agent in a baseball, tennis ball, badminton birdie, or volleyball or light that is preferentially reflected by these objects. Background windows and spectral-width windows are then provided so that backgrounds are apparent, scenes appear natural, and the wearer's focus and depth perception are improved. For sports played on various surfaces, or in different settings such as tennis or volleyball, different background windows can be provided for play on different surfaces. For example, tennis is commonly played on grass courts or clay courts, and filters can be configured for each surface, if desired. As another example, ice hockey can be played on an ice surface that is provided with a wavelength-conversion agent or colorant and lenses configured for viewing a hockey puck with respect to such ice. Outdoor volleyball requires accurate viewing of a volleyball against a blue sky, and the background filter can be selected to permit accurate background viewing while enhancing contrast in outdoor lighting. A different configuration can be provided for indoor volleyball. Eyewear that includes such filters can be activity-specific, surface-specific, or setting-specific. In addition, tinted eyewear can be provided for activities other than sports in which it is desirable to identify, locate, or track an object against backgrounds associated with the activity. Some representative activities include dentistry, surgery, bird watching, fishing, or search and rescue operations. Such filters can also be provided in additional configurations such as filters for still and video cameras, or as viewing screens that are placed for the use of spectators or other observers. Filters can be provided as lenses, unitary lenses, or as face shields. For example, a filter for hockey can be included in a face shield.

Representative embodiments have been described above with reference to filter transmission, but reflective filters can also be made. In addition, a neutral density filter can be provided in conjunction with the filters described above in order to reduce light intensities to levels that produce comfortable viewing.

Embodiments are described above with reference to several particular examples. It will be apparent to those skilled in the art that these examples can be modified in arrangement and detail without departing from the principles of the invention. We claim all that is encompassed by the appended claims.

We claim:

1. An optical filter for viewing an object, the filter having a spectral transmittance that includes an object-contrast spectral window and a background spectral window.

2. The filter of claim 1, wherein the spectral transmittance of the filter includes a spectral-width window.

3. The filter of claim 1, wherein the background spectral window is a wavelength range from about 540 nm to about 560 nm.

4. The filter of claim 1, wherein the background spectral window is a wavelength range of from about 530 nm to about 570 nm.

5. The filter of claim 1, wherein the background window corresponds to at least a portion of a spectral reflectance of vegetation.

6. The filter of claim 1, wherein the object-contrast window corresponds to a wavelength-conversion spectrum of light produced by the object.

7. The filter of claim 6, wherein the background spectral window is a wavelength range of from about 530 nm to about 570 nm.

8. The filter of claim 7, wherein the filter includes a spectral-width window.

9. The filter of claim 7, wherein the spectral-width window includes wavelengths greater than about 610 nm.

10. An optical filter having a first spectral window selected to preferentially transmit light from an object and a second spectral window selected to preferentially transmit light from a background.

11. The optical filter of claim 10, wherein the first spectral window is selected to transmit wavelength-converted light from the object.

12. The optical filter of claim 10, wherein the first spectral window is selected to transmit light reflected by the object.

13. Eyewear for viewing of an object with respect to a background, comprising: a frame; and
   at least one lens configured to be placed with respect to a wearer's eyes so that the wearer looks through the lens, the lens defining a spectral transmittance having an object-contrast spectral window and a background spectral window.

14. The eyewear of claim 13, wherein the background spectral window corresponds to a wavelength range in which the background is reflective.

15. The eyewear of claim 13, wherein the background spectral window corresponds to a reflectance spectrum of vegetation.

16. The eyewear of claim 13, wherein the object-contrast window corresponds to a spectrum of wavelength-converted light produced by the object.

17. The eyewear of claim 13, wherein the lens defines a spectral-width window.

18. Eyewear, comprising an optical filter that includes an object-contrast spectral window and a background spectral window.

19. The eyewear of claim 18, wherein the object-contrast spectral window corresponds to an object-specific spectral reflectance.

20. The eyewear of claim 18, wherein the object-contrast spectral window corresponds to an object-specific wavelength-conversion spectrum.

21. Activity-specific eyewear, comprising:
   a lens having a spectral transmittance that includes a background spectral window and an object-contrast spectral window; and
   a frame configured to retain and situate the lens so that a wearer views through the lens with the eyewear as worn.

22. The eyewear of claim 21, wherein the lens is a unitary lens and is situated by the frame so that a wearer views through the lens with both eyes with the eyewear as worn.

23. The eyewear of claim 21, wherein the object-contrast spectral window corresponds to a spectrum of wavelength-converted light produced by a golf ball.

24. The eyewear of claim 21, wherein the object-contrast spectral window corresponds to a spectrum of light received from an activity-specific object.

25. The eyewear of claim 21, wherein the background spectral window corresponds to a spectrum of light received from an activity-specific background.

26. A method of selecting a filter for viewing an object with respect to a background, the method comprising:
   selecting an object-contrast spectral window corresponding to radiation received from the object;
   selecting a background spectral window corresponding to radiation received from the background; and
   providing an optical filter that includes the object-contrast spectral window and the background spectral window.

27. The method of claim 26, wherein the object-contrast spectral window and the background spectral window are transmission windows.

28. The method of claim 26, further comprising:
   selecting a spectral-width window; and
   providing an optical filter that includes the spectral-width window.

29. The method of claim 26, wherein the object-contrast window corresponds to a reflectance spectrum of the object.

30. The method of claim 26, wherein the object-contrast window corresponds to a wavelength-conversion spectrum of radiation from the object.

31. The method of claim 26, wherein the background spectral window corresponds to a reflectance spectrum of the background.

32. The method of claim 26, wherein the object-contrast spectral window, the background spectral window, and the spectral-width window are wavelengths from about 440 nm to about 470 nm, about 510 nm to about 580 nm, and about 600 nm to about 650 nm, respectively.

* * * * *

UNITED STATES PATENT AND TRADEMARK OFFICE
CERTIFICATE OF CORRECTION

PATENT NO. : 6,631,987 B2
APPLICATION NO. : 09/768940
DATED : October 14, 2003
INVENTOR(S) : Reichow et al.

It is certified that error appears in the above-identified patent and that said Letters Patent is hereby corrected as shown below:

In Column 4, line 17, "XB" should read -- $\lambda_B$ --

Signed and Sealed this

Eleventh Day of July, 2006

JON W. DUDAS
*Director of the United States Patent and Trademark Office*